(12) United States Patent
Hosotani et al.

(10) Patent No.: US 12,549,094 B2
(45) Date of Patent: Feb. 10, 2026

(54) SWITCHING POWER SUPPLY DEVICE WITH NOISE REDUCTION FILTER

(71) Applicant: Murata Manufacturing Co., Ltd., Kyoto-fu (JP)

(72) Inventors: Tatsuya Hosotani, Nagaokakyo (JP); Hiroyuki Takatsuji, Nagaokakyo (JP); Yuki Ishikura, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 246 days.

(21) Appl. No.: 18/335,058

(22) Filed: Jun. 14, 2023

(65) Prior Publication Data

US 2023/0327546 A1 Oct. 12, 2023

Related U.S. Application Data

(63) Continuation of application No. PCT/JP2021/045425, filed on Dec. 10, 2021.

(30) Foreign Application Priority Data

Dec. 21, 2020 (JP) ................................ 2020-210980

(51) Int. Cl.
*H02M 1/44* (2007.01)
*H02M 1/14* (2006.01)

(52) U.S. Cl.
CPC ............. *H02M 1/44* (2013.01); *H02M 1/143* (2013.01)

(58) Field of Classification Search
CPC ................................. H02M 1/44; H02M 1/143
See application file for complete search history.

(56) References Cited

U.S. PATENT DOCUMENTS

| 2014/0084791 A1* | 3/2014 | Takahashi | H02M 1/126 315/85 |
| 2014/0285176 A1* | 9/2014 | Takahashi | H05B 45/375 323/364 |
| 2016/0308399 A1* | 10/2016 | Nakamura | B60L 53/122 |
| 2018/0019663 A1* | 1/2018 | Fukumasu | H05K 5/04 |

(Continued)

FOREIGN PATENT DOCUMENTS

| CN | 111313669 A | * | 6/2020 |
| JP | 2006271135 A | * | 10/2006 |

(Continued)

OTHER PUBLICATIONS

Translation of CN111313669A by Clarivate Analytics, Apr. 2025, 8 pages.*

(Continued)

*Primary Examiner* — Harry R Behm
(74) *Attorney, Agent, or Firm* — Studebaker Brackett PLLC (57) ABSTRACT

A switching power supply device includes power supply input lines, DC output lines, a DC-DC converter circuit, and a noise reduction circuit. The noise reduction circuit includes a first half-bridge capacitor circuit that is connected between the power supply input lines, a second half-bridge capacitor circuit that is connected between the DC output lines, a first common mode choke coil, and an electrical path. The electrical path electrically connects a midpoint of the first half-bridge capacitor circuit to a midpoint of the second half-bridge capacitor circuit.

20 Claims, 9 Drawing Sheets

(56) References Cited

U.S. PATENT DOCUMENTS

2018/0337610 A1* 11/2018 Leong .................. H02M 1/083
2021/0111638 A1* 4/2021 Araumi .................. H02M 1/44

FOREIGN PATENT DOCUMENTS

| | | |
|---|---|---|
| JP | 2015-104268 A | 6/2015 |
| JP | 2015-220953 A | 12/2015 |
| JP | 2016-058495 A | 4/2016 |
| JP | 2016-158316 A | 9/2016 |
| JP | 2016-208596 A | 12/2016 |
| JP | 2018161024 A * | 10/2018 ............... H02H 9/08 |

OTHER PUBLICATIONS

Translation of JP2006271135A by Clarivate Analytics, Apr. 2025, 7 pages.*
Translation of JP2018161024A by Clarivate Analytics, Apr. 2025, 6 pages.*
International Search Report issued in PCT/JP2021/045425; mailed Feb. 8, 2022.

* cited by examiner

SWITCHING POWER SUPPLY DEVICE WITH NOISE REDUCTION FILTER

CROSS-REFERENCE TO RELATED APPLICATIONS

This application claims benefit of priority to International Patent Application No. PCT/JP2021/045425, filed Dec. 10, 2021, and to Japanese Patent Application No. 2020-210980, filed Dec. 21, 2020, the entire contents of each are incorporated herein by reference.

BACKGROUND

Technical Field

The present disclosure relates to a switching power supply device including a DC-DC converter circuit and a noise reduction circuit.

Background Art

A DC-DC converter circuit is a circuit that performs, using a switching circuit, power conversion of a DC input current, and includes a feedback control circuit to output a predetermined DC voltage in response to variations in the input voltage and a load.

In a DC-DC converter circuit, electromagnetic noise caused by a switching operation is superimposed on an output line. This generates common mode noise, and a problem of electromagnetic interference (EMI) occurs. Thus, in a typical switching power supply device including a DC-DC converter circuit, a noise reduction circuit to suppress EMI is provided.

To suppress EMI, a noise suppression circuit including a plurality of large-scale common mode choke coils (CMCCs) having high impedance is configured. In contrast, since a filter circuit for noise suppression is large in size and expensive, resultant increases in the size and cost of the switching power supply device are problematic.

SUMMARY

As a DC-DC converter circuit including an EMI suppression circuit is disclosed, for example, in Japanese Unexamined Patent Application Publication No. 2006-271135. A first series circuit in which two capacitors are connected in series is provided on an input side of the DC-DC converter circuit. A second series circuit in which two capacitors are connected in series is provided on an output side of the DC-DC converter circuit. A connection point between the capacitors in the first series circuit and a connection point between the capacitors in the second series circuit are connected by a metal plate.

With the arrangement mentioned above, the potential of a DC output line can be relatively stabilized, and generation of electromagnetic interference can be reduced.

Typically, however, noise suppression in a switching power supply device is performed after circuit design of a DC-DC converter is completed. When an EMI noise suppression circuit is adjusted for noise suppression, the adjustment affects an operation of a feedback control circuit of the DC-DC converter and causes malfunction of the DC-DC converter. Thus, in order to suppress malfunction of the DC-DC converter, circuit design of the DC-DC converter needs to be performed again. This causes a new problem such as extension of a designing period. Furthermore, a countermeasure such as adding a large-scale EMI noise circuit is needed, and this causes a problem such as an increase in the size of the switching power supply device.

Furthermore, in the case where the area of the metal plate is large, the potential of the metal plate is likely to be the same as the frame ground. Thus, in the case where the capacitances of the capacitors configuring the EMI suppression circuit are adjusted, the amount of leakage current increases, and the risk of electrical shock increases. This also causes a problem in terms of ensuring safety.

As described above, the switching power supply device including the DC-DC converter circuit is required to implement EMI suppression, ensure power integrity (ensure the quality of power supply), shorten the designing period of the switching power supply device, and the like at the same time.

Thus, the present disclosure suppresses the influence of common mode noise on feedback control in a switching power supply device including a DC-DC converter circuit and a feedback control circuit.

A switching power supply device according to an example of the present disclosure includes DC input lines; DC output lines; a DC-DC converter circuit; and a noise reduction circuit. The DC-DC converter circuit includes an inductor, a switching circuit that causes a switching current to flow to the inductor, a first input capacitor that serves as an input power supply connected in parallel to the DC input lines, a first output capacitor that is connected in parallel to the DC output lines, an output voltage detection circuit that is connected in parallel to the DC output lines, and a feedback control circuit that controls the switching circuit in such a manner that an output voltage from the DC output lines is a predetermined voltage. The noise reduction circuit includes a first half-bridge capacitor circuit that is connected between the DC input lines, a second half-bridge capacitor circuit that is connected between the DC output lines, a first common mode choke coil that is connected between the second half-bridge capacitor circuit and the switching circuit, and an electrical path that electrically connects a midpoint of the first half-bridge capacitor circuit to a midpoint of the second half-bridge capacitor circuit to configure a noise balancing circuit that balances common mode noise having a potential different from a ground.

With this arrangement, the noise balancing circuit suppresses the influence of the common mode noise on the feedback control circuit.

A switching power supply device according to an example of the present disclosure includes DC input lines; DC output lines; a DC-DC converter circuit; and a noise reduction circuit. The DC-DC converter circuit includes an inductor, a switching circuit that causes a switching current to flow to the inductor, a first output capacitor that is connected in parallel to the DC output lines, an output voltage detection circuit that is connected in parallel to the DC output lines, and a feedback control circuit that controls the switching circuit in such a manner that an output voltage from the DC output lines is a predetermined voltage. The noise reduction circuit includes a first half-bridge capacitor circuit that is connected between the DC input lines, a second half-bridge capacitor circuit that is connected between the DC output lines, a second common mode choke coil that is connected between the switching circuit and the first half-bridge capacitor circuit, and an electrical path that electrically connects a midpoint of the first half-bridge capacitor circuit to a midpoint of the second half-bridge capacitor circuit to configure a noise balancing circuit that balances common mode noise having a potential different from a ground.

With this arrangement, the noise balancing circuit suppresses the influence of the common mode noise on the feedback control circuit.

According to the present disclosure, the influence of common mode noise on feedback control can be suppressed in a switching power supply device using a DC-DC converter circuit including a feedback control circuit.

DETAILED DESCRIPTION

Hereinafter, a plurality of embodiments for implementing the present disclosure will be described by giving some specific examples with reference to drawings. In the drawings, the same parts are denoted by the same signs. Taking into consideration the easiness of explanation or understanding of main points, the embodiments will be described separately for the sake of convenience. However, configurations described in different embodiments may be partially replaced or combined. In the second and subsequent embodiments, descriptions of things common to the first embodiment will be omitted, and only differences will be described. In particular, similar operational effects based on similar configurations are not repeatedly described in the individual embodiments.

First Embodiment

Figure 1:
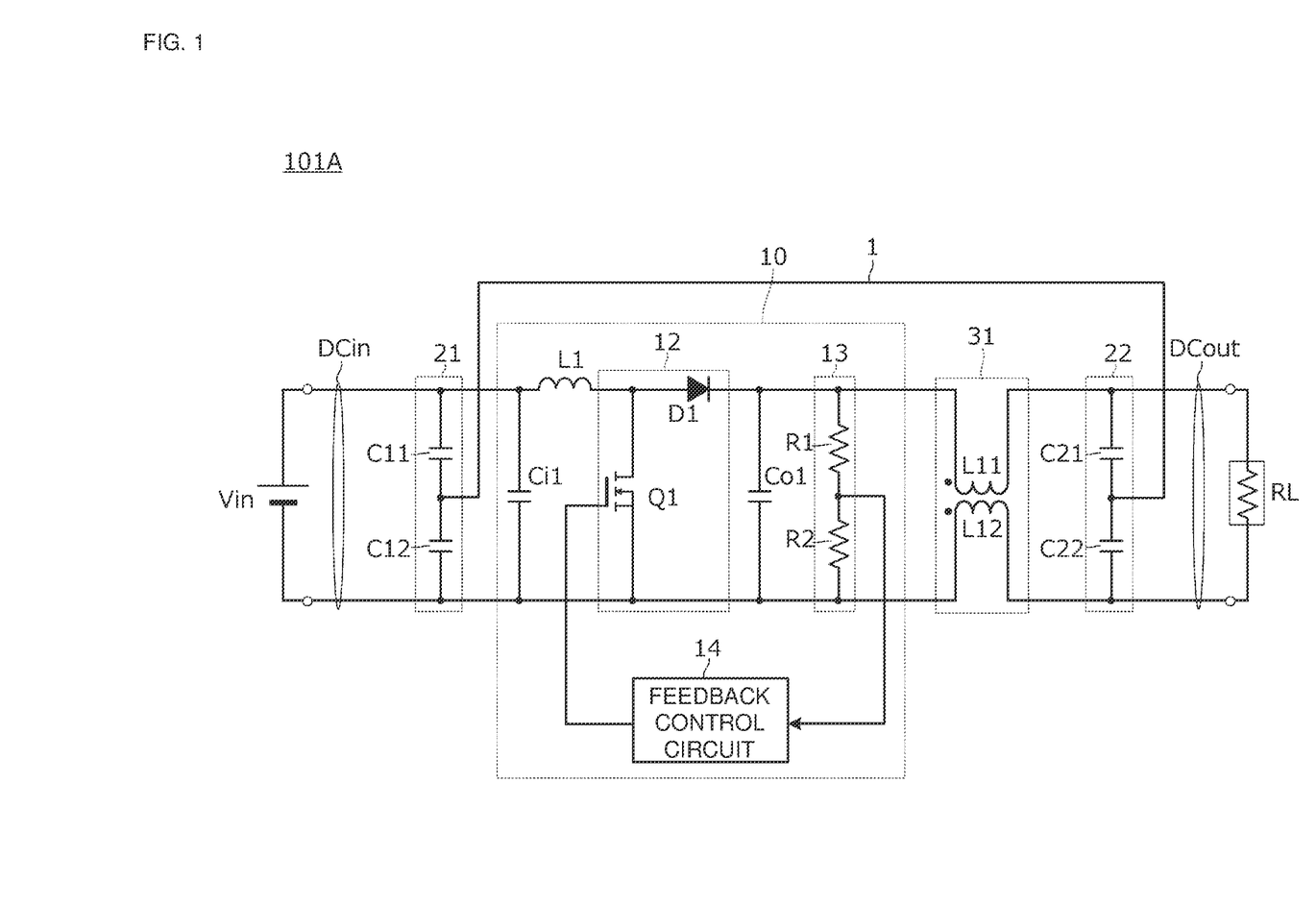
FIG. 1 is a circuit diagram of a switching power supply device according to a first embodiment.

FIG. 1 is a circuit diagram of a switching power supply device 101A according to a first embodiment. The switching power supply device 101A is connected between a DC power supply Vin and a load circuit RL. Furthermore, the switching power supply device 101A includes a DC-DC converter circuit 10 and a noise reduction circuit.

The DC-DC converter circuit 10 includes power supply input lines DCin, DC output lines DCout, an inductor L1, a switching circuit 12 that causes a switching current to flow to the inductor L1, a first input capacitor Ci1 that serves as an input power supply connected in parallel to the power supply input lines DCin, a first output capacitor Co1 that is connected in parallel to the DC output lines DCout, an output voltage detection circuit 13 that is connected in parallel to the DC output lines DCout, and a feedback control circuit 14 that controls the switching circuit 12 in such a manner that the output voltage from the DC output lines DCout is a predetermined voltage. The switching circuit 12 includes a switching element Q1 and a diode D1.

The noise reduction circuit includes a circuit 21 (hereinafter, referred to as a "first half-bridge capacitor circuit") that is connected between the power supply input lines DCin and includes capacitors C11 and C12 connected in series to each other, a circuit 22 (hereinafter, referred to as a "second half-bridge capacitor circuit") that is connected between the DC output lines DCout and includes capacitors C21 and C22 connected in series to each other, a first common mode choke coil 31 that is connected between the switching circuit 12 and the second half-bridge capacitor circuit 22, and an electrical path 1 that electrically connects a midpoint of the first half-bridge capacitor circuit 21 to a midpoint of the second half-bridge capacitor circuit 22. The first common mode choke coil 31 includes coils L11 and L12 that are magnetically coupled to each other. The first half-bridge capacitor circuit 21, the second half-bridge capacitor circuit 22, and the electrical path 1 configure a noise balancing circuit that balances common mode noise having a potential different from the ground. In other words, the noise reduction circuit includes the noise balancing circuit and the first common mode choke coil 31.

The noise balancing circuit suppresses the influence of common mode noise on the feedback control circuit 14. Since the midpoint of the first half-bridge capacitor circuit 21 has an intermediate potential between the power supply input lines DCin and the midpoint of the second half-bridge capacitor circuit 22 has an intermediate potential between the DC output lines DCout, common connection through the electrical path 1 between the intermediate potential parts cancels out the difference between a common mode noise component on the input side of the DC-DC converter circuit 10 and a common mode noise component on the output side of the DC-DC converter circuit 10. More specifically, common mode noises have relatively high frequency and includes different phases. Thus, when both the common mode noises flow to the electrical path 1, the common mode noises cancel each other out. Accordingly, common mode noise having a potential different from the ground is balanced.

It is desirable that the electrical path 1 be formed of a metal plate. Due to the electrical path 1 formed of a metal plate, voltage drop by the electrical path 1 decreases, and the potential difference between the midpoint of the first half-bridge capacitor circuit 21 and the midpoint of the second half-bridge capacitor circuit 22 decreases. Thus, balancing of the common mode noise mentioned above operates more effectively.

Furthermore, since the first common mode choke coil 31 is connected between the switching circuit 12 and the second half-bridge capacitor circuit 22, the first common mode choke coil 31 suppresses common mode noise superimposed on the DC output lines DCout in the DC-DC converter circuit 10. Since the first common mode choke coil 31 is connected between the first half-bridge capacitor circuit 21 and the second half-bridge capacitor circuit 22, the amount of common mode current flowing to the output voltage detection circuit 13, the first half-bridge capacitor circuit 21, and the second half-bridge capacitor circuit 22 can be reduced. Thus, the influence on the feedback control circuit 14 can be suppressed.

For EMI suppression, capacitances of the capacitors C11, C12, C21, and C22 need to be optimized. In known technologies, adjustment (change) of these capacitances affects the feedback control circuit 14, and the feedback control circuit 14 thus needs to be redesigned. However, in an embodiment, the amount of common mode current flowing to the output voltage detection circuit 13, the first half-bridge capacitor circuit 21, and the second half-bridge capacitor circuit 22 can be reduced, and the influence on the feedback control circuit 14 can be suppressed. Thus, the feedback control circuit 14 does not need to be redesigned.

Furthermore, provision of the first common mode choke coil 31 allows the capacitances of the capacitors C11, C12, C21, and C22 configuring the first half-bridge capacitor circuit 21 and the second half-bridge capacitor circuit 22 to be reduced. Thus, the amount of leakage current does not increase.

It is desirable that the negative pole of the DC output lines DCout have the same potential as the potential of the frame ground of a casing into which the DC output lines DCout are incorporated. This brings the effect and advantage that common mode current flowing from the DC output lines DCout to the frame ground of the casing into which the DC output lines DCout are incorporated is suppressed and common mode noise is thus significantly reduced. Furthermore, an operation of reduction in the amount of common mode current flowing to the output voltage detection circuit 13 and suppression of the influence on the feedback control circuit 14 brings the effect and advantage that the feedback control circuit 14 does not need to be redesigned.

As described above, a compact and inexpensive switching power supply device with a shortened designing period and ensured safety can be obtained. That is, the switching power supply device 101A that has a configuration including a feedback control circuit can attain operational effects described below while suppressing the influence of common mode noise on the feedback control circuit. Also in the case where the capacitances of filter capacitors configuring the EMI suppression circuit are adjusted in the switching power supply device 101A, the designing period can be significantly shortened, and safety can be ensured while a power conversion operation being implemented without the amount of leakage current being increased. Furthermore, even if the capacitances of the filter capacitors are adjusted in the switching power supply device 101A, the change in the feedback control circuit and the increase in the amount of leakage current are negligible, safety can be ensured, and decreases in the size and cost can be achieved.

Figure 2:
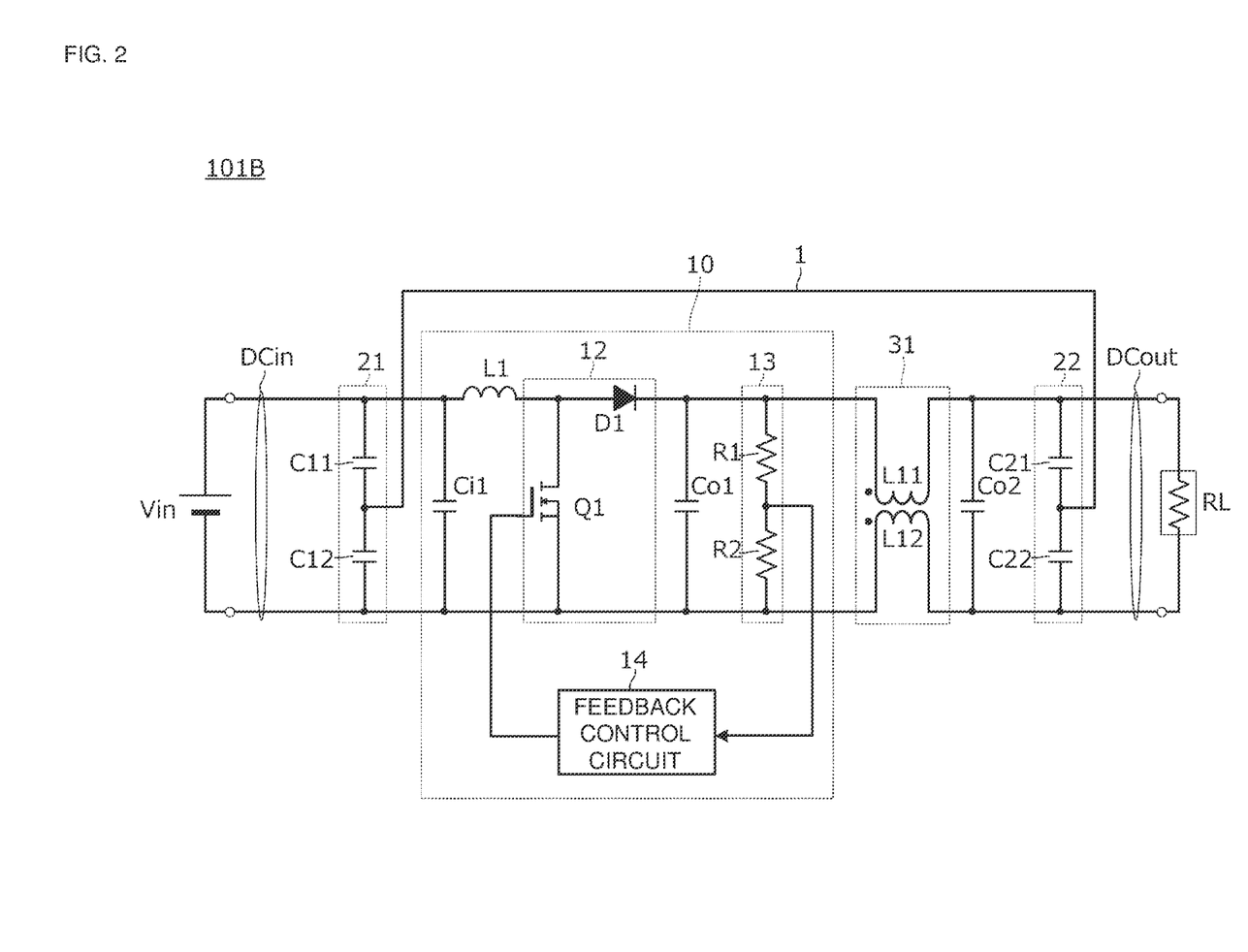
FIG. 2 is a circuit diagram of a switching power supply device according to the first embodiment.

FIG. 2 is a circuit diagram of another switching power supply device 101B according to the first embodiment. The switching power supply device 101B is different from the switching power supply device 101A illustrated in FIG. 1 in that the switching power supply device 101B includes a second output capacitor Co2. The switching power supply device 101B includes the second output capacitor Co2 that is connected between the DC output lines DCout at a position that is closer to the load than the first common mode choke coil 31 is. The other configurations are the same as those of the switching power supply device 101A illustrated in FIG. 1.

In the switching power supply device 101B illustrated in FIG. 2, even if the capacitances of the capacitors C21 and C22 configuring the second half-bridge capacitor circuit 22 are small, a smoothing effect of the output voltage is increased due to a smoothing operation of the second output capacitor. Thus, noise caused by a change in load current can be suppressed effectively.

Second Embodiment

In a second embodiment, a switching power supply device that is different from the examples described above in the connection position of the output voltage detection circuit 13 will be described as an example.

Figure 3:
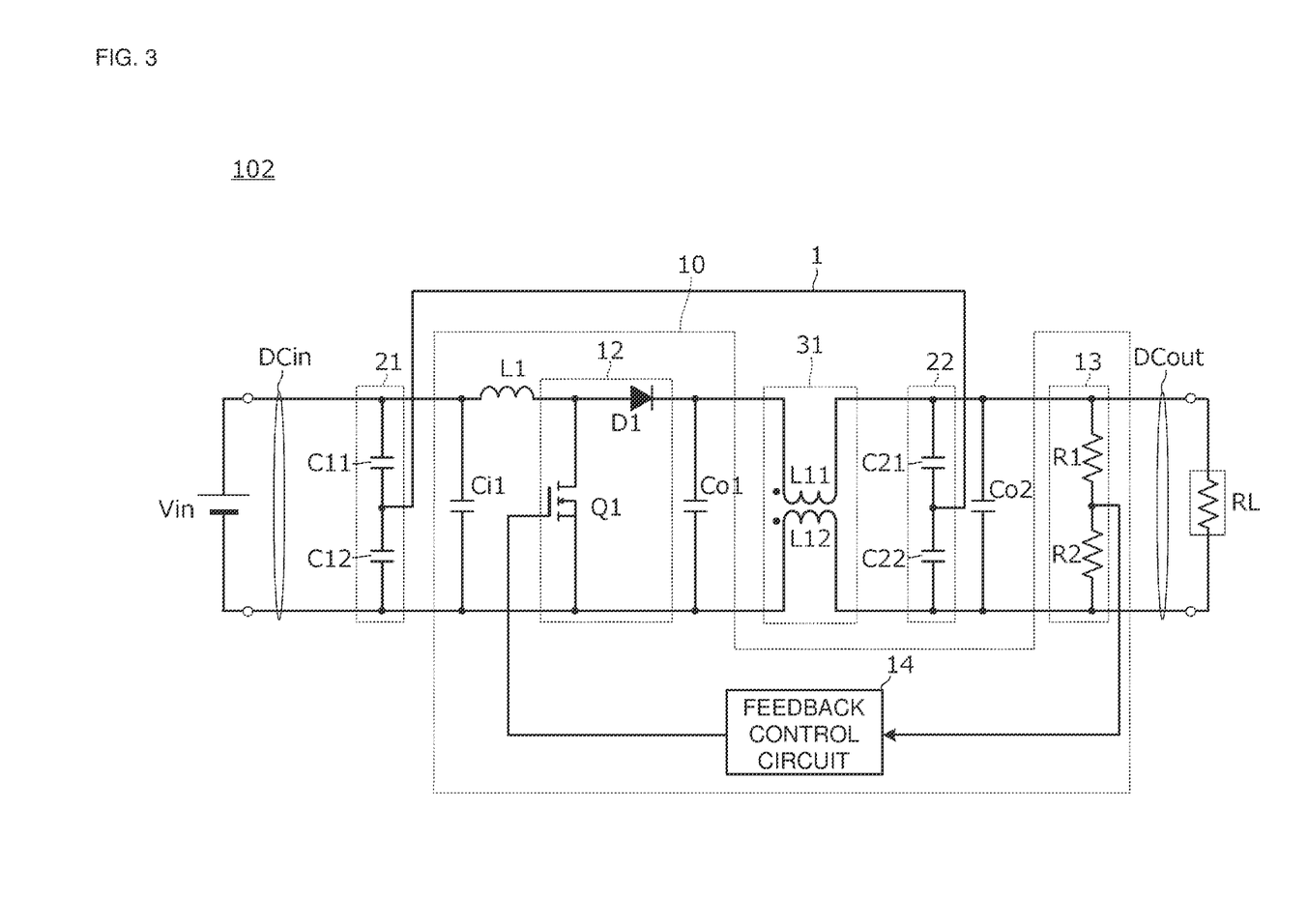
FIG. 3 is a circuit diagram of a switching power supply device according to a second embodiment.

FIG. 3 is a circuit diagram of a switching power supply device 102 according to the second embodiment. The switching power supply device 102 is connected between the DC power supply Vin and the load circuit RL. Furthermore, the switching power supply device 102 includes the DC-DC converter circuit 10 and a noise reduction circuit. In FIG. 3, circuits other than the DC-DC converter circuit 10 configure the noise reduction circuit.

The DC-DC converter circuit 10 includes the power supply input lines DCin, the DC output lines DCout, the inductor L1, the switching circuit 12 that causes a switching current to flow to the inductor L1, the first input capacitor Ci1 that serves as an input power supply connected in parallel to the power supply input lines DCin, the first output capacitor Co1 and the second output capacitor Co2 that are connected in parallel to the DC output lines DCout, the output voltage detection circuit 13 that is connected in parallel to the DC output lines DCout, and the feedback control circuit 14 that controls the switching circuit 12 in such a manner that the output voltage from the DC output lines DCout is a predetermined voltage.

The noise reduction circuit includes the first half-bridge capacitor circuit 21 that is connected between the power supply input lines DCin, the second half-bridge capacitor circuit 22 that is connected between the DC output lines DCout, the first common mode choke coil 31 that is connected between the switching circuit 12 and the second half-bridge capacitor circuit 22, and the electrical path 1 that electrically connects the midpoint of the first half-bridge capacitor circuit 21 to the midpoint of the second half-bridge capacitor circuit 22. The first half-bridge capacitor circuit 21, the second half-bridge capacitor circuit 22, and the electrical path 1 configure a noise balancing circuit that balances common mode noise having a potential different from the ground.

The output voltage detection circuit 13 is connected in parallel to both ends of the second half-bridge capacitor circuit 22.

According to this embodiment, the voltage of the DC output lines DCout supplied to the load circuit RL is detected. Thus, the accuracy of detection of the output voltage increases. The other operational effects are similar to those described above in the first embodiment.

Third Embodiment

In a third embodiment, an example in which the connection position of a common mode choke coil is different from the examples described above in the first and second embodiments will be described.

Figure 4:
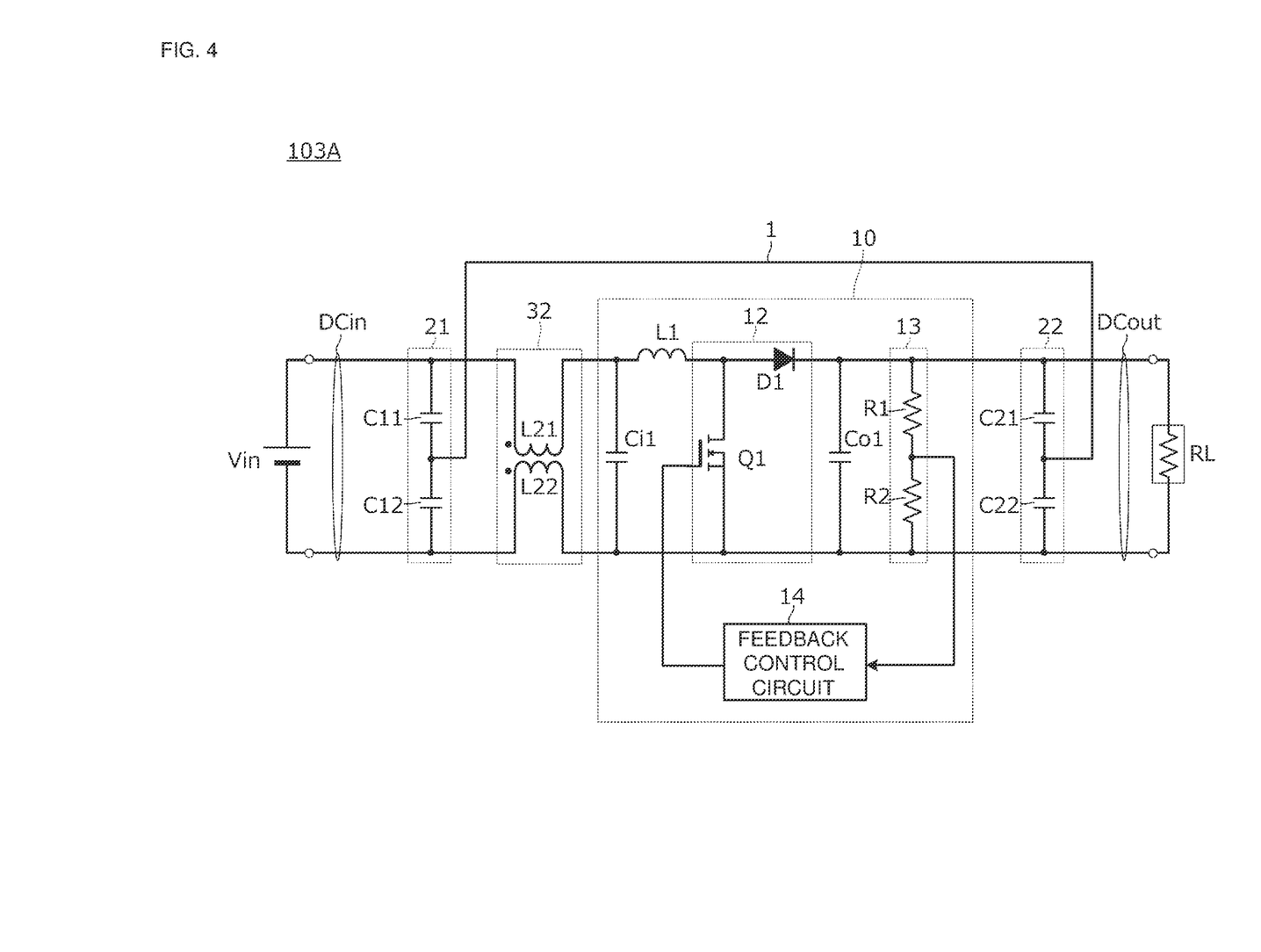
FIG. 4 is a circuit diagram of a switching power supply device according to a third embodiment.

FIG. 4 is a circuit diagram of a switching power supply device 103A according to the third embodiment. The switching power supply device 103A is connected between the DC power supply Vin and the load circuit RL. Furthermore, the switching power supply device 103A includes the DC-DC converter circuit 10 and a noise reduction circuit. In FIG. 4, circuits other than the DC-DC converter circuit 10 configure the noise reduction circuit.

The DC-DC converter circuit 10 includes the power supply input lines DCin, the DC output lines DCout, the inductor L1, the switching circuit 12 that causes a switching current to flow to the inductor L1, the first input capacitor Ci1 that serves as an input power supply connected in parallel to the power supply input lines DCin, the first output capacitor Co1 that is connected in parallel to the DC output lines DCout, the output voltage detection circuit 13 that is connected in parallel to the DC output lines DCout, and the feedback control circuit 14 that controls the switching circuit 12 in such a manner that the output voltage from the DC output lines DCout is a predetermined voltage.

The noise reduction circuit includes the first half-bridge capacitor circuit 21 that is connected between the power supply input lines DCin and includes the capacitors C11 and C12 connected in series to each other, the second half-bridge capacitor circuit 22 that is connected between the DC output lines DCout and includes the capacitors C21 and C22 connected in series to each other, a second common mode choke coil 32 that is connected between the first half-bridge capacitor circuit 21 and the switching circuit 12, and the electrical path 1 that electrically connects the midpoint of the first half-bridge capacitor circuit 21 to the midpoint of the second half-bridge capacitor circuit 22. The first half-bridge capacitor circuit 21, the second half-bridge capacitor circuit 22, and the electrical path 1 configure a noise balancing circuit that balances common mode noise having a potential different from the ground.

The second common mode choke coil 32 suppresses common mode noise superimposed on the power supply input lines DCin in the DC-DC converter circuit 10. Since the second common mode choke coil 32 is connected between the first half-bridge capacitor circuit 21 and the switching circuit 12, common mode noise generated from the switching circuit 12 is balanced between the first half-bridge capacitor circuit 21 and the second half-bridge capacitor circuit 22. Thus, flowing of a common mode current to the output voltage detection circuit 13 is reduced, and the influence on the feedback control circuit 14 is suppressed.

Furthermore, with the provision of the second common mode choke coil 32, the capacitances of the capacitors C11, C12, C21, and C22 configuring the first half-bridge capacitor circuit 21 and the second half-bridge capacitor circuit 22 can be reduced. Therefore, the amount of leakage current does not increase.

Figure 5:
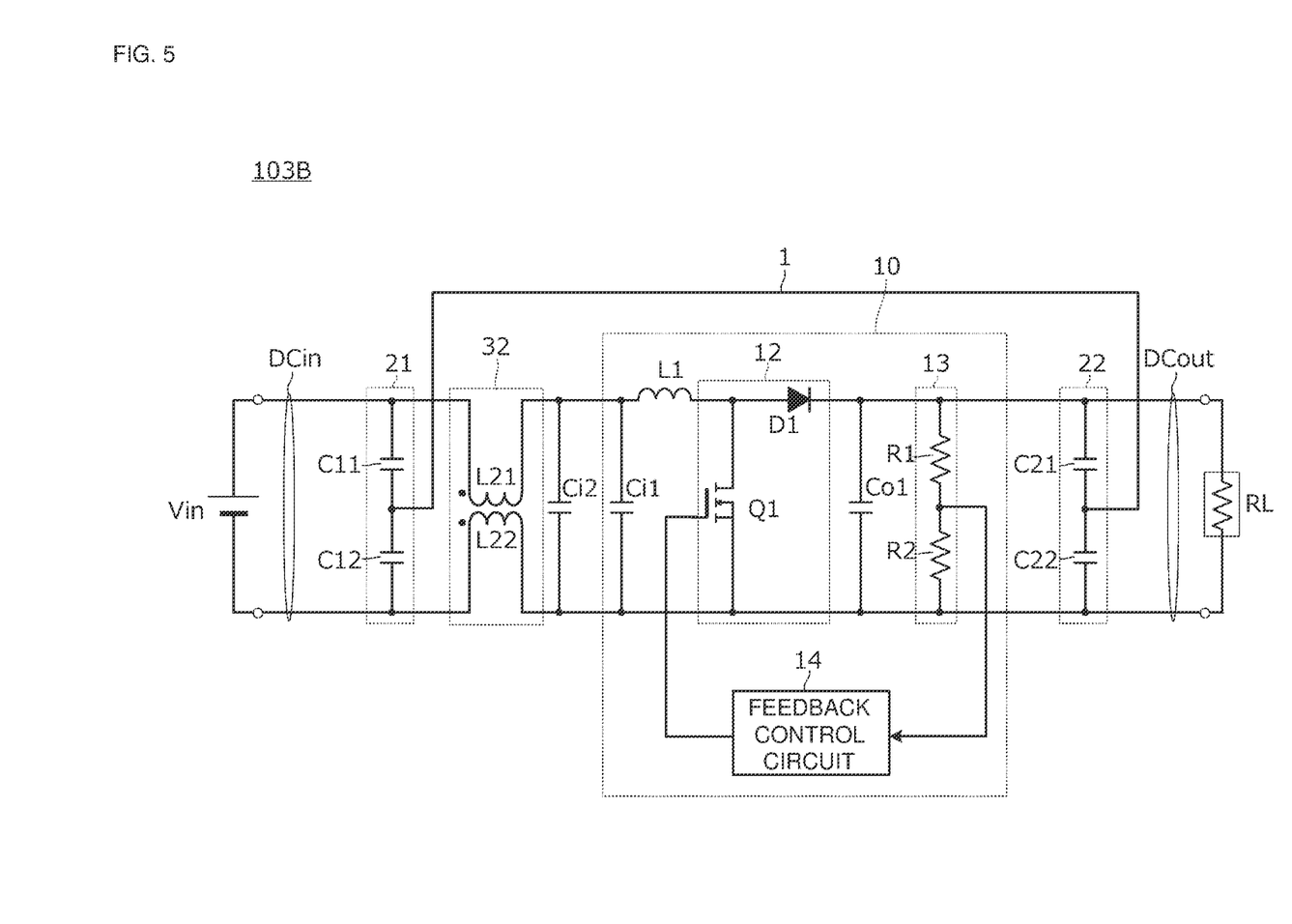
FIG. 5 is a circuit diagram of a switching power supply device according to the third embodiment.

FIG. 5 is a circuit diagram of a switching power supply device 103B according to the third embodiment. The switching power supply device 103B is different from the switching power supply device 103A illustrated in FIG. 4 in that the switching power supply device 103B includes a second input capacitor Ci2. In the switching power supply device 103B, the second input capacitor Ci2 is connected between the power supply input lines DCin at a position that is closer to the DC-DC converter circuit 10 than the second common mode choke coil 32 is. The other configurations are the same as those of the switching power supply device 103A illustrated in FIG. 4.

In the switching power supply device 103B illustrated in FIG. 5, even if the capacitances of the capacitors C11 and C12 configuring the first half-bridge capacitor circuit 21 are small, a smoothing effect of the input voltage is increased due to a smoothing operation of the input capacitor Ci. Thus, noise caused by a change in the input voltage can be suppressed effectively.

The other operational effects similar to those in the first and second embodiments can be achieved.

Fourth Embodiment

In a fourth embodiment, a switching power supply device in which an impedance element is connected to the electrical path 1 will be described as an example.

Figure 6:
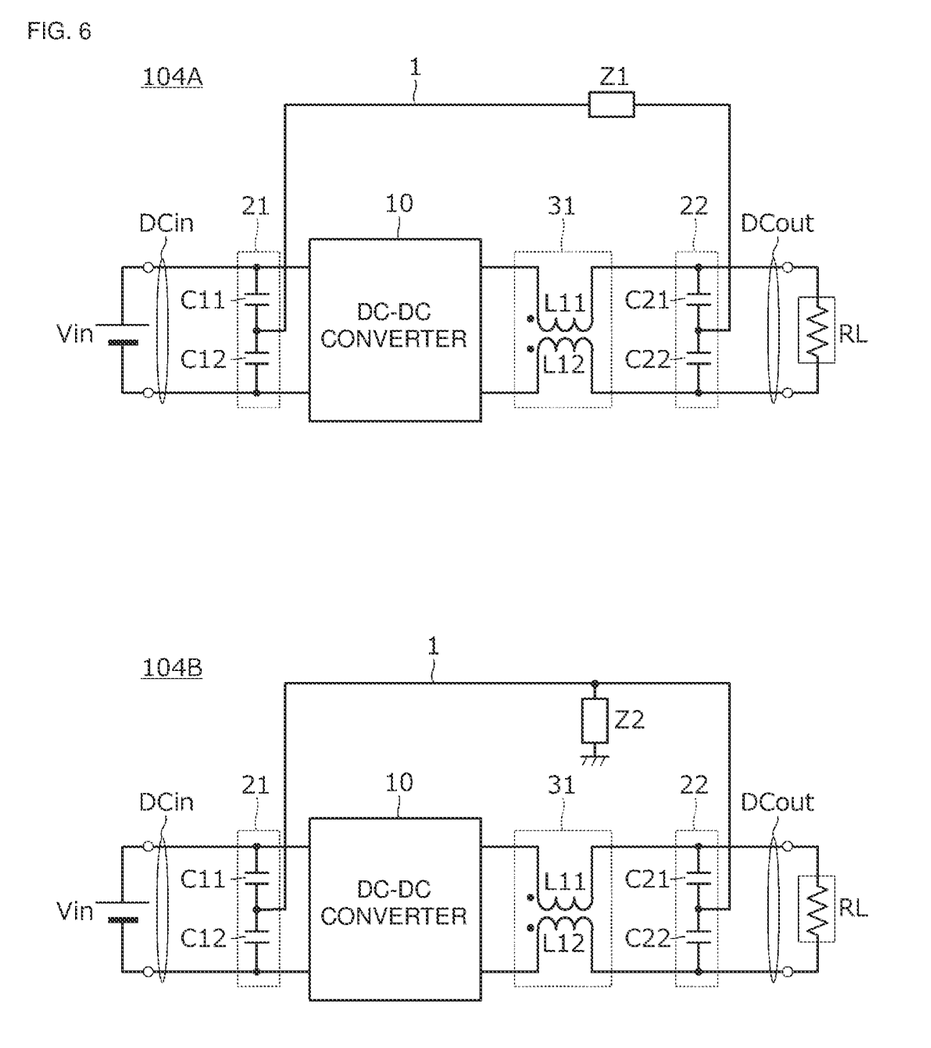
FIG. 6 is a circuit diagram of switching power supply devices according to a fourth embodiment.

FIG. 6 is a circuit diagram of switching power supply devices 104A and 104B according to a fourth embodiment. The switching power supply devices 104A and 104B each include the DC-DC converter circuit 10, the first half-bridge capacitor circuit 21, the second half-bridge capacitor circuit 22, and the first common mode choke coil 31. Furthermore, each of the switching power supply devices 104A and 104B includes the electrical path 1 that electrically connects the midpoint of the first half-bridge capacitor circuit 21 to the midpoint of the second half-bridge capacitor circuit 22.

An impedance element Z1 is connected in series to the electrical path 1 of the switching power supply device 104A. The impedance element Z1 has at least an inductance component or a resistance component.

An impedance element Z2 is connected between the electrical path 1 of the switching power supply device 104B and the ground. The impedance element Z2 has at least a capacitance component, an inductance component, or a resistance component. The "ground" represents earth or frame ground.

By connecting the impedance element Z1 in series to the electrical path 1 as in the switching power supply device 104A, even if an effect of suppression of common mode noise by the first common mode choke coil 31 is not sufficient, suppression of the common mode noise is supplemented by the impedance element Z1. That is, since moving energy for balancing between the first half-bridge capacitor circuit 21 and the second half-bridge capacitor circuit 22 through the electrical path 1 is consumed as heat by the impedance element Z1, common mode noise is suppressed by the amount of consumption.

In the switching power supply device 104B, the impedance element Z2 is connected between the electrical path 1 and the ground. The impedance element Z2 has at least a capacitance component, an inductance component, or a resistance component.

As described above, by connecting the impedance element Z2 between the electrical path 1 and the ground, even if an effect of suppression of common mode noise by the first common mode choke coil 31 is not sufficient, suppression of the common mode noise is supplemented by the impedance element Z2. That is, flowing current for balancing between the first half-bridge capacitor circuit 21 and the second half-bridge capacitor circuit 22 through the electrical path 1 flows through the impedance element Z2 to the ground. The amount of this current (leakage current) is smaller than the amount of current that leaks to the ground from a line bypass capacitor circuit in the case where the line bypass capacitor circuit is provided. Thus, the operational effect that the increase in the leakage current is negligible even if the capacitances of the first half-bridge capacitor circuit 21 and the second half-bridge capacitor circuit 22 are increased, can be achieved.

Figure 7:
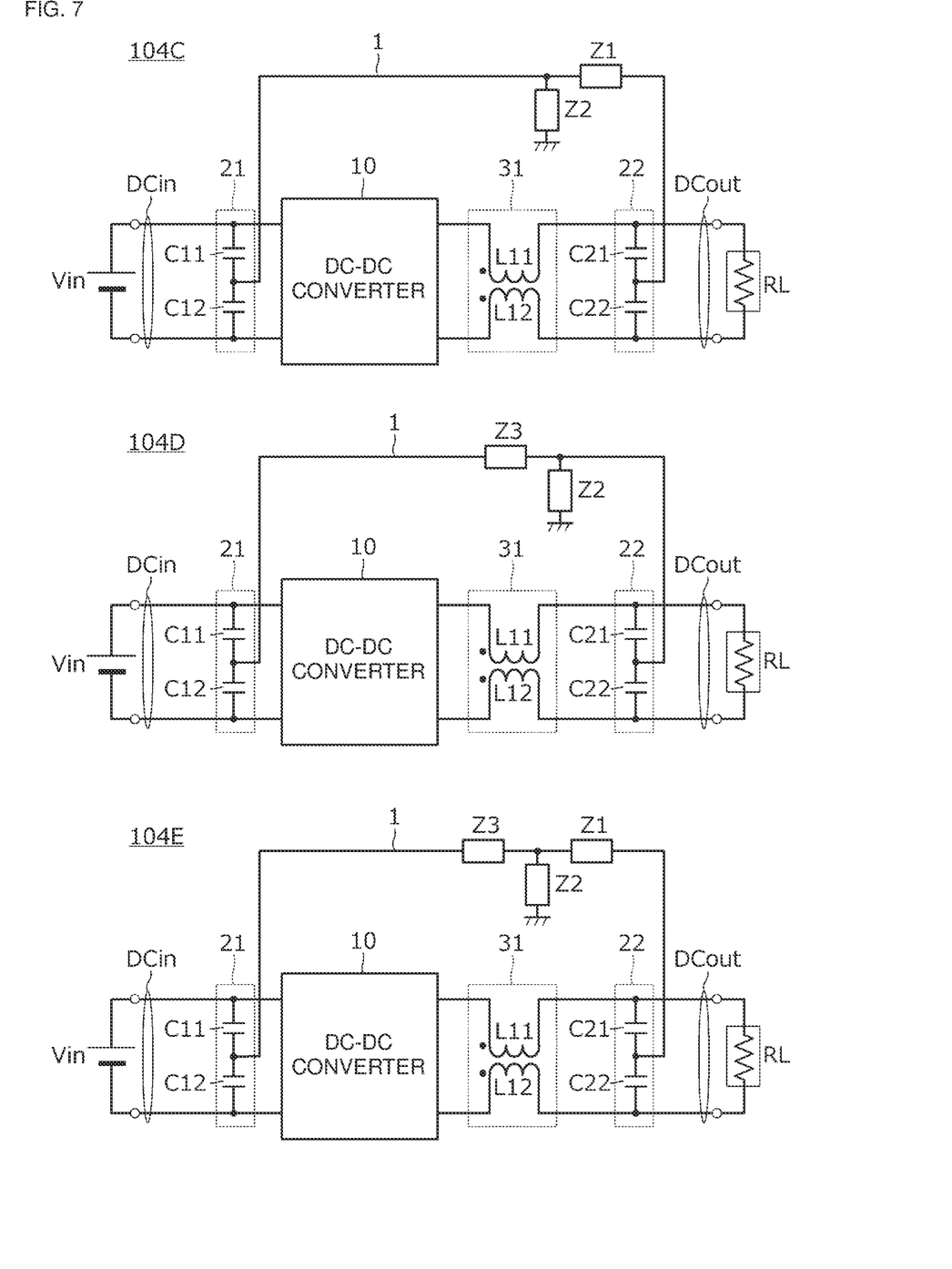
FIG. 7 is a circuit diagram of other switching power supply devices according to the fourth embodiment.

FIG. 7 is a circuit diagram of other switching power supply devices 104C, 104D, and 104E according to the fourth embodiment. In each of the switching power supply devices 104C, 104D, and 104E, the impedance element Z2 is connected between the electrical path 1 and the ground.

In the switching power supply device 104C, the impedance element Z1 is connected in series between a connection point of the impedance element Z2 with respect to the electrical path 1 and the midpoint of the second half-bridge capacitor circuit 22. Furthermore, in the switching power supply device 104D, an impedance element Z3 is connected in series between the connection point of the impedance element Z2 with respect to the electrical path 1 and the midpoint of the first half-bridge capacitor circuit 21. In the switching power supply device 104E, the impedance element Z1 is connected in series between the connection point of the impedance element Z2 with respect to the electrical path 1 and the midpoint of the second half-bridge capacitor circuit 22, and the impedance element Z3 is connected in series between the connection point of the impedance element Z2 with respect to the electrical path 1 and the midpoint of the first half-bridge capacitor circuit 21.

In each of the switching power supply devices 104C, 104D, and 104E illustrated in FIG. 7, in the case where the impedance elements Z1 and Z3 are resistors or inductors and the impedance element Z2 is a capacitor, these impedance elements configure a low pass filter. Furthermore, in the case where the impedance elements Z1 and Z3 are capacitors and the impedance element Z2 is a resistor or an inductor, these impedance elements configure a high pass filter.

As described above, by connecting a frequency filter to the electrical path 1, responsiveness of feedback to the common mode voltage of the power supply input lines DCin with respect to variations in the common mode voltage output to the DC output lines DCout can be set in an appropriate manner.

Fifth Embodiment

In a fifth embodiment, a switching power supply device that includes a DC-DC converter having a configuration different from the configurations of the DC-DC converters described above, will be described as an example.

Figure 8A:
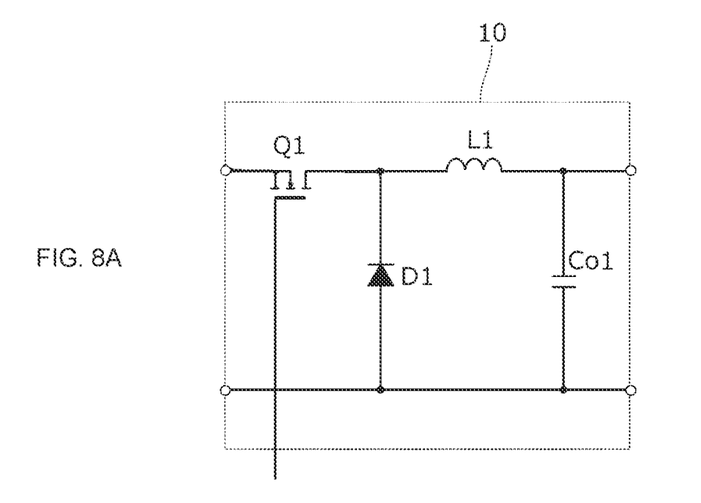
FIG. 8A is a circuit diagram of a step-down DC-DC converter circuit included in a switching power supply device according to the fourth embodiment.
Figure 8B:
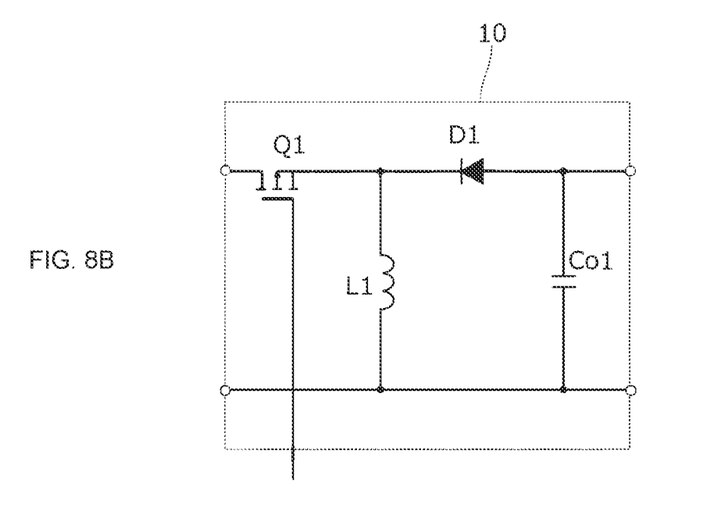
FIG. 8B is a circuit diagram of a step-up/down DC-DC converter circuit.

FIG. 8A is a circuit diagram of a step-down DC-DC converter circuit 10 included in a switching power supply device according to the fifth embodiment, and FIG. 8B is a circuit diagram of a step-up/down DC-DC converter circuit 10. Configurations of the switching power supply device other than the DC-DC converter circuits 10 mentioned above are similar to those in the embodiments described above.

The DC-DC converter circuit 10 illustrated in FIG. 8A includes the switching element Q1, the diode D1, the inductor L1, and the first output capacitor Co1. A switching current is caused to flow to the inductor L1 by switching of the switching element Q1, and a regenerative current thus flows to the diode D1.

The DC-DC converter circuit 10 illustrated in FIG. 8B includes the switching element Q1, the diode D1, the inductor L1, and the first output capacitor Co1. A switching current is caused to flow to the inductor L1 by switching of the switching element Q1, and a regenerative current thus flows to the diode D1.

As described above, a DC-DC converter included in a switching power supply device is not necessarily a step-up converter, and a step-down converter or a step-up/down converter is also applicable to a DC-DC converter included in a switching power supply device in a similar manner.

Sixth Embodiment

In a sixth embodiment, a switching power supply device that includes a DC-DC converter having a configuration different from the configurations of the DC-DC converters described above, will be described as an example.

Figure 9:
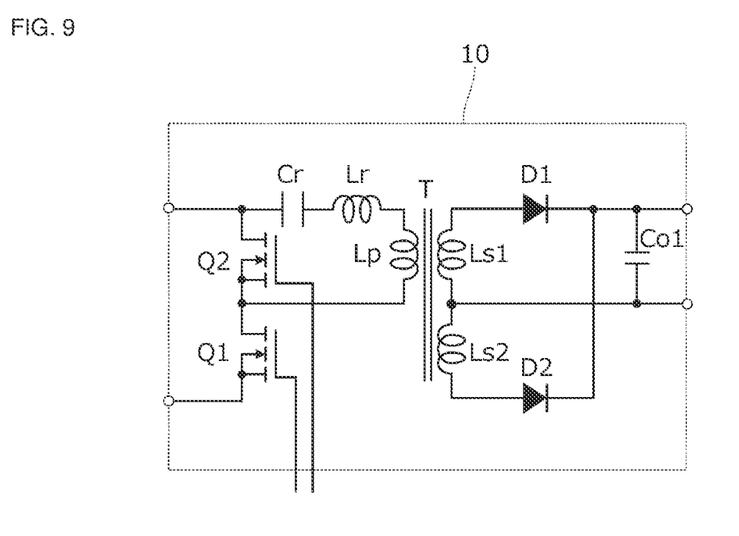
FIG. 9 is a circuit diagram of a DC-DC converter circuit included in a switching power supply device according to a fifth embodiment.

FIG. 9 is a circuit diagram of the DC-DC converter circuit 10 included in a switching power supply device according to the sixth embodiment. Configurations of the switching power supply device other than the DC-DC converter circuit 10 are similar to those in the embodiments described above.

The DC-DC converter circuit 10 illustrated in FIG. 9 is a half-bridge DC-DC converter of a current resonance type, and an LC resonance circuit including an inductor Lr and a capacitor Cr and two switching elements Q1 and Q2 are connected to a primary wire Lp of a transformer T. A rectifying/smoothing circuit including diodes D1 and D2 and the first output capacitor Co1 is configured for secondary wires Ls1 and Ls2 of the transformer T.

With the arrangement described above, the switching elements Q1 and Q2 are complementarily turned on and off with dead times inserted, and the waveform of a current flowing to the transformer T is a resonance waveform of a sine wave shape. Furthermore, during both the ON period and the OFF period of the two switching elements Q1 and Q2, electric power is transmitted from the primary side to the secondary side.

As described above, an insulating converter is also applicable to a DC-DC converter included in a switching power supply device in a similar manner.

Finally, the present disclosure is not limited to the embodiments described above. Changes and modifications may be made in an appropriate manner by those skilled in the art. The scope of the present disclosure is not defined by the embodiments described above but is defined by the scope of the claims. The scope of the present disclosure includes changes and modifications from embodiments within the scope of the claims and equivalents thereof

What is claimed is:

1. A switching power supply device comprising:
DC input lines;
DC output lines;
a DC-DC converter circuit; and
a noise reduction circuit,
wherein
the DC-DC converter circuit includes
an inductor,
a switching circuit configured to cause a switching current to flow to the inductor,
a first input capacitor configured as an input power supply connected in parallel to the DC input lines,
a first output capacitor that is connected in parallel to the DC output lines,
an output voltage detection circuit that is connected in parallel to the DC output lines, and
a feedback control circuit configured to control the switching circuit such that an output voltage from the DC output lines is a predetermined voltage,
the noise reduction circuit includes
a first half-bridge capacitor circuit that is connected between the DC input lines,
a second half-bridge capacitor circuit that is connected between the DC output lines,
a first common mode choke coil that is connected between the second half-bridge capacitor circuit and the switching circuit, and
an electrical path that electrically connects a midpoint of the first half-bridge capacitor circuit to a midpoint of the second half-bridge capacitor circuit to configure a noise balancing circuit that balances common mode noise having a potential different from a ground,
the feedback control circuit receives an input from the output voltage detection circuit and provides an output to control a switch in the switching circuit,
the noise balancing circuit is configured by the first half-bridge capacitor circuit, the second half-bridge capacitor circuit and the electrical path, the electrical path is electrically connected to the feedback control circuit, to which the output voltage detection circuit is connected, through the second half-bridge capacitor circuit and the first common mode choke coil, and
a common mode noise component on the input side of the DC-DC converter circuit and a common mode noise component on the output side of the DC-DC converter circuit flow to the electrical path, and the common mode noise components cancel each other out, thereby reducing the common-mode current flowing to the output voltage detection circuit.

2. The switching power supply device according to claim 1, wherein
the noise balancing circuit is configured to suppress influence of the common mode noise on the feedback control circuit.

3. The switching power supply device according to claim 2, further comprising:
a second output capacitor that is connected between the DC output lines at a position that is closer to a load than is the first common mode choke coil.

4. The switching power supply device according to claim 2, wherein
the output voltage detection circuit is connected in parallel to both ends of the second half-bridge capacitor circuit.

5. The switching power supply device according to claim 2, wherein
the DC-DC converter circuit is a non-insulating converter of any one of a step-down type, a step-up type, and a step-up/down type.

6. The switching power supply device according to claim 2, wherein
the DC-DC converter circuit is an insulating converter in which a primary side and a secondary side are electrically insulated from each other by a transformer.

7. The switching power supply device according to claim 2, further comprising:
an impedance element that is connected in series to the electrical path and has an inductance component or a resistance component.

8. The switching power supply device according to claim 1, further comprising:
a second output capacitor that is connected between the DC output lines at a position that is closer to a load than is the first common mode choke coil.

9. The switching power supply device according to claim 8, wherein
the output voltage detection circuit is connected in parallel to both ends of the second half-bridge capacitor circuit.

10. The switching power supply device according to claim 1, wherein
the output voltage detection circuit is connected in parallel to both ends of the second half-bridge capacitor circuit.

11. The switching power supply device according to claim 1, wherein
the DC-DC converter circuit is a non-insulating converter of any one of a step-down type, a step-up type, and a step-up/down type.

12. The switching power supply device according to claim 1, wherein
the DC-DC converter circuit is an insulating converter in which a primary side and a secondary side are electrically insulated from each other by a transformer.

13. The switching power supply device according to claim 1, further comprising:
an impedance element that is connected in series to the electrical path and has an inductance component or a resistance component.

14. The switching power supply device according to claim 1, further comprising:
an impedance element that is connected between the electrical path and the ground and has a capacitance component, an inductance component, or a resistance component.

15. The switching power supply device according to claim 1, wherein
the electrical path includes a metal plate.

16. The switching power supply device according to claim 1, wherein
a negative pole of the DC output lines has a same potential as a potential of a frame ground of a casing into which the DC output lines are incorporated.

17. A switching power supply device comprising:
DC input lines;
DC output lines;
a DC-DC converter circuit; and
a noise reduction circuit,
wherein
the DC-DC converter circuit includes
an inductor,
a switching circuit configured to cause a switching current to flow to the inductor,
a first output capacitor that is connected in parallel to the DC output lines,
an output voltage detection circuit that is connected in parallel to the DC output lines, and
a feedback control circuit configured to control the switching circuit such that an output voltage from the DC output lines is a predetermined voltage,
the noise reduction circuit includes
a first half-bridge capacitor circuit that is connected between the DC input lines,
a second half-bridge capacitor circuit that is connected between the DC output lines,
a second common mode choke coil that is connected between the switching circuit and the first half-bridge capacitor circuit, and
an electrical path that electrically connects a midpoint of the first half-bridge capacitor circuit to a midpoint of the second half-bridge capacitor circuit to configure a noise balancing circuit that balances common mode noise having a potential different from a ground,
the feedback control circuit receives an input from the output voltage detection circuit and provides an output to control a switch in the switching circuit,
the noise balancing circuit is configured by the first half-bridge capacitor circuit, the second half-bridge capacitor circuit and the electrical path,
the electrical path is electrically connected to the feedback control circuit, to which the output voltage detection circuit is connected, through the second half-bridge capacitor circuit and the first common mode choke coil, and
a common mode noise component on the input side of the DC-DC converter circuit and a common mode noise component on the output side of the DC-DC converter circuit flow to the electrical path, and the common mode noise components cancel each other out, thereby reducing the common-mode current flowing to the output voltage detection circuit.

18. The switching power supply device according to claim 17, further comprising:
a second input capacitor that is connected between the DC input lines at a position that is closer to the DC-DC converter circuit than is the second common mode choke coil.

19. A switching power supply device comprising:
DC input lines;
DC output lines;
a DC-DC converter circuit; and
a noise reduction circuit,
wherein
the DC-DC converter circuit includes
an inductor,
a switching circuit configured to cause a switching current to flow to the inductor,
a first output capacitor that is connected in parallel to the DC output lines,
an output voltage detection circuit that is connected in parallel to the DC output lines, and
a feedback control circuit configured to control the switching circuit such that an output voltage from the DC output lines is a predetermined voltage,
the noise reduction circuit includes
a first half-bridge capacitor circuit that is connected between the DC input lines,
a second half-bridge capacitor circuit that is connected between the DC output lines,
a second common mode choke coil that is connected between the switching circuit and the first half-bridge capacitor circuit, and
an electrical path that electrically connects a midpoint of the first half-bridge capacitor circuit to a midpoint of the second half-bridge capacitor circuit to configure a noise balancing circuit that balances common mode noise having a potential different from a ground,
the noise balancing circuit is configured to suppress influence of the common mode noise on the feedback control circuit,
the feedback control circuit receives an input from the output voltage detection circuit and provides an output to control a switch in the switching circuit,
the noise balancing circuit is configured by the first half-bridge capacitor circuit, the second half-bridge capacitor circuit and the electrical path,
the electrical path is electrically connected to the feedback control circuit, to which the output voltage detection circuit is connected, through the second half-bridge capacitor circuit and the first common mode choke coil, and
a common mode noise component on the input side of the DC-DC converter circuit and a common mode noise component on the output side of the DC-DC converter circuit flow to the electrical path, and the common mode noise components cancel each other out, thereby reducing the common-mode current flowing to the output voltage detection circuit.

20. The switching power supply device according to claim 19, further comprising:
a second input capacitor that is connected between the DC input lines at a position that is closer to the DC-DC converter circuit than is the second common mode choke coil.

* * * * *